United States Patent [19]

Creuzet

[11] 4,084,771
[45] Apr. 18, 1978

[54] HOT AIR AEROSTAT

[76] Inventor: Robert Armand Creuzet, Marmande, France

[21] Appl. No.: 670,563

[22] Filed: Mar. 25, 1976

[30] Foreign Application Priority Data

Mar. 27, 1975 France ............................. 75 09709
Mar. 17, 1976 France ............................. 76 07714

[51] Int. Cl.² .................................................. B64B 1/62
[52] U.S. Cl. ....................................... 244/31; 244/33; 244/98
[58] Field of Search ................. 244/31, 33, 97, 98, 244/99, 153 R, 30; 46/77; 40/214

[56] References Cited

U.S. PATENT DOCUMENTS

| 262,235 | 8/1882 | Lilliendahl | 244/98 |
| 1,275,710 | 8/1918 | Lewis | 244/33 |
| 1,302,007 | 4/1919 | Calthrop | 244/33 |
| 1,866,079 | 7/1932 | Blondin | 244/31 |
| 2,471,544 | 5/1949 | Ring | 244/153 R X |
| 3,109,611 | 11/1963 | Yost | 244/31 |
| 3,170,658 | 2/1965 | Yost | 244/98 |

FOREIGN PATENT DOCUMENTS

4,098 of 1882 United Kingdom ............... 244/31

Primary Examiner—Barry L. Kelmachter
Attorney, Agent, or Firm—Haseltine, Lake & Waters

[57] ABSTRACT

An aerostat comprising a closed envelope carrying a nacelle which accomodates a ventilator for driving in air through an appropriate device is disclosed. A burner is movably placed inside the envelope, together with an ignition device and a shield, the envelope further including a valve operable from the nacelle which is fitted with railings so that a cable and various other components can be attached to the aerostat.

8 Claims, 8 Drawing Figures

HOT AIR AEROSTAT

The invention has for its object an aerostat.

Aerostats are known, which include an envelope containing hot air, and heating means in the form of a burner provided in front of a lower opening in the envelope.

These aerostats are operable in a simple and economical manner.

But, heretofore, it has not been possible to use them as captive ballons. The envelope of such an aerostat with no internal pressure, when maintained by a cable, is flattened out under the action of wind, even if relatively weak, which causes a partial deflation of the aerostat and consequently its fall.

Up to now, then, captive ballons include an envelope enclosing a gas lighter than air, such as hydrogen or helium. The use of such ballons is costly because of the price of the gas.

This invention has for its object a hot air aerostat, characterized in that the means for heating the air contained in the envelope is located inside this envelope.

The envelope of the aerostat can then be a closed envelope and, in use as captive balloon, the hot air aerostat remains inflated even when subjected to the action of the wind.

As heating means inside the envelope, a gas burner is preferably used, the burner being connected to a fuel reserve carried in the nacelle of the aerostat.

This nacelle is provided with a means to remotely control the ignition of the inflammable gas.

In a first embodiment, the aerostat comprises means for introduction into the envelope of the inflating air. After this inflating phase the air introduced is heated by means inside the envelope.

The introduction is preferably made by means of a flexible sleeve member which rises under the effect of the air driven back during the inflating phase and which, collapsing when the flow of air driven back ceases, restores the continuity of the closed enclosure which the envelope constitutes.

The invention also has for its object, as an alternative, a hot air aerostat with a closed enclosure containing air heated during filling or inflating thereof.

According to another alternative, air is only preheated during filling to insure the rising of the envelope and the complementary heating for ascension is provided by the burner inside the envelope.

An aerostat according to this invention further comprises, preferably, an upper valve the opening of which enables the hot air to discharge upon command from the nacelle, in view of descent, and one or several lower valves for discharge of carbon dioxide, if necessary. The atmosphere required for a good combustion of the fuel is thus maintained inside the envelope.

Another upper valve is provided, with an automatic opening, to prevent any overpressure inside the envelope.

This invention also has for its object an embodiment characterized by the fact that the enclosure for hot air is limited on one hand, by the flexible envelope of the aerostat and the other hand, at the lower end, by a platform for various uses and which essentially supports means enabling the filling of the envelope with air and also the burner for heating the air.

According to another embodiment, the burner is carried by an extensible device, in such a manner that, being substantially at the height of the platform when not in use, it is raised in order to heat the air inside the envelope.

The invention provides that the raising of the burner is caused by means, such as springs, which become taut during the lowering back of the device.

According to another characteristic of this invention, the platform comprises also valve means to evacuate hot air. The construction of the balloon is thus simplified and its efficiency increased.

Whereas, it is usual to retain the captive balloon specially a spherical balloon, by means of a cable attached to the nacelle, the invention provides a securing means removed laterally from the axis of the balloon and preferably at a level higher than that of the nacelle.

According to another embodiment, the equipment platform which carries a rail or horizontal bar, at the extremity of which there is provided a fastening means.

The fastening means is preferably mounted in sliding relationship along the rail, which enables it to be moved towards the axis of the balloon when it is desired to haul the balloon towards the ground.

A rail or bar depending from the platform is provided for other uses, such as securing of observation means, securing for a releasing operation, and the like.

The following description, given as an example, refers to the accompaying drawings, in which.

Figure 1:
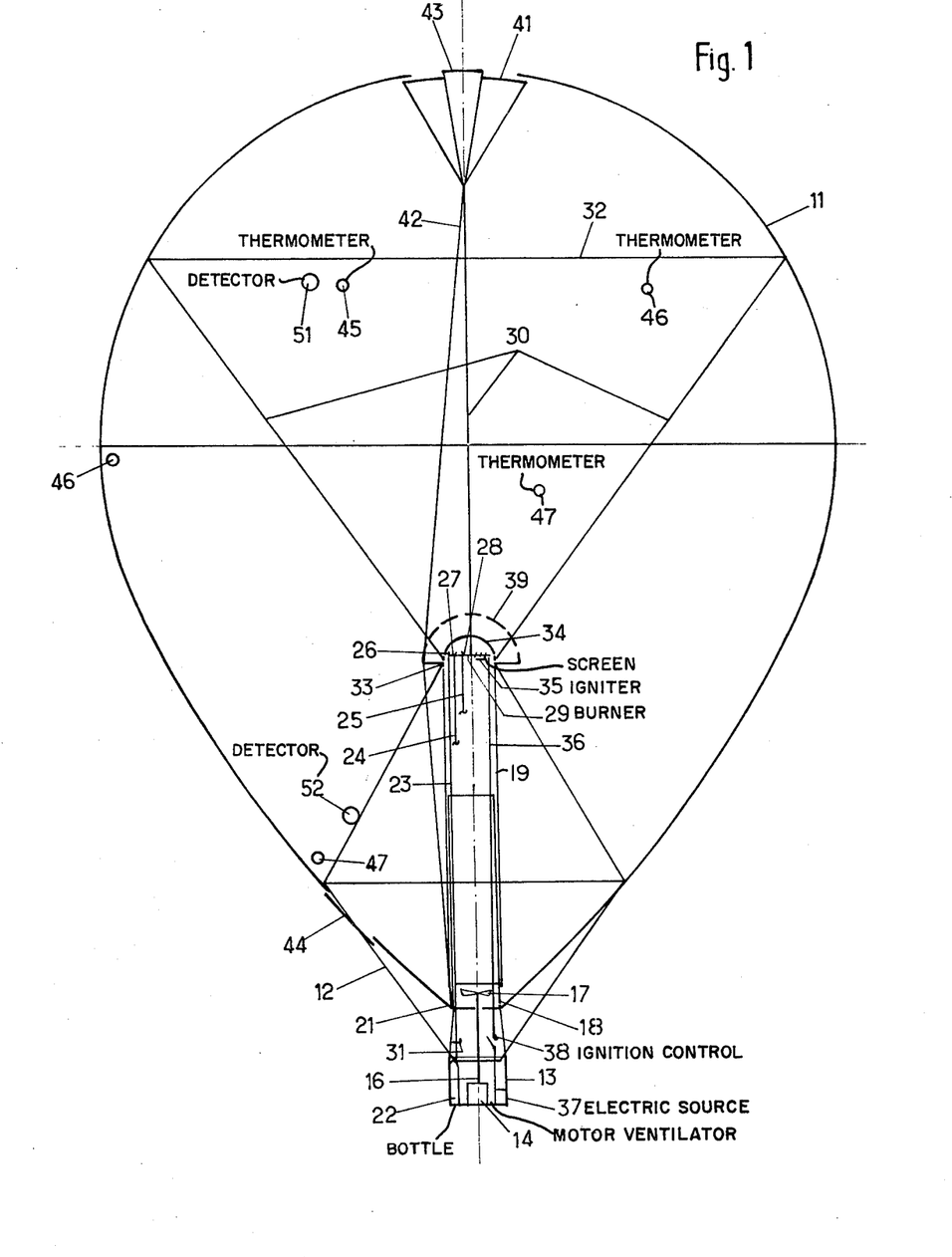
FIG. 1 is a schematical view of an aerostat.

Reference is first made to FIG. 1; the aerostat comprises an envelope 11, preferably in nylon cloth. From the envelope depends, at the lower end, for example, attached by suspender means 12, a nacelle 13. Said nacelle accomodates a motor ventilator group 14 which comprises a motor, for example burning petrol, gas, or oil, and the shaft 16 of which, vertical, or horizontal with a bevel gear, drives a fan 17 with a screen 18. The screen is secured to a load ring 21 to which is fastened the lower opening of the envelope. On the load ring 21 is also fastened at one of its ends, a cylindrical air sleeve 19, in nylon cloth or the like, which is constructed such that it substantially closes the opening of the envelope when it is folded in a random fashion.

The nacelle 13 also accommodates a fuel reserve, for example bottles 22 of liquid propane. From the fuel reserve, flexible pipes 23, 24, 25 lead to rings 26, 27, 28 of a burner 29, the valves 31 enabling to feed as desired one or more rings 26–28. The flexible pipes 23–25 have not been shown extended to the bottle 22 for the sake of clarity of the drawing.

An ignition means 35 is part of the burner and is connected by a conductor means 36 to an electric source 37, the ignition control being provided by a button 38.

The burner 29 is suspended by cables 30 to an upper ring 32 which is part of the sustaining structure of the envelope, and secured by other cables fastened to a lower ring of the structure. The cables also carry a screen in metal gauze or perforated sheet metal and closed at its upper end by an end portion 34, also in metal gauze, to stop the flame of the burner. Another metal gauze, of hemispheric shape, 39, in metal grating or metal gauze is provided to protect the envelope in course of inflating or when it sinks at landing.

The burner and the screen are placed inside the envelope significantly underneath the equatorial plane of the latter.

A valve 41 is provided at the upper end of the envelope and operable from the nacelle by means of a cable 42. Another valve 43 is part of the valve 41 and operates automatically, opening whenever the internal pressure of the envelope exceeds a predetermined value.

One or several valves 44 are provided at the lower end of the envelope, in the neighbourhood of the junction of the envelope with the ring 21.

To inflate the aerostat, the motor of the motor-ventilator group 14 is turned on. The air taken in from outside is driven in by the fan 17, inside the envelope through the sleeve 19, which rises under the effect of the air circulation and against the action of the force of gravity. The envelope, initially spread and collapsed on the nacelle 13, fills progressively with air, at a temperatue slightly greater than that of the surrounding air if the exhaust gases from the motor are simultaneously driven into the sleeve member.

While the envelope has reached a predetermined degree of inflation, the volume attained being about 3/4 of the final volume, the motor is stopped; air is no longer driven in through sleeve 19 and the latter subsides falling back under its own weight onto the bottom of the envelope, closing by the folds it forms the passageway between the inside of the envelope an the external atmosphere.

The burner 29 is fed and the ignition of the inflammable gas is obtained by means of the electrical spark igniter 35, by simple pressing of button 38. For this phase, two of the burner rings are fed with inflammable gas. By combustion of the gas inside the enclosure which the envelope constitutes, the air contained inside the envelope is rapidly heated.

After casting off the moorings ropes, the balloon rises under the effect of the buoyant force developed by the hot air contained inside the envelope 11.

In the case where the aerostat is used as a captive balloon, the aerostat takes with it the cable which is to keep it bound to the ground until it reaches the desired height and in this position it is held by the cable.

The aerostat can fulfill the same functions as a captive balloon filled with a light gas as hydrogen, coal gas or helium, but without the expense resulting from the supply of such gases.

A lateral wind does not cause deflation of the envelope, the enclosure being limited by the envelope being closed.

When it is desired to increase or to maintain the buoyant force, the burner 29 is reignited; usually only one ring is ignited.

The use of the three rings is provided to control a faster ascension.

To cause the aerostat to descend, the valve 41 is opened which causes hot air to discharge.

Inside the envelope are provided a certain number of detection means; the thermometers 45, 46, 47, and furthermore, a detector 51 transmits to the nacelle of the pressure inside the envelope.

Detection means 52 placed at the lower end of the enclosure and limited by the envelope provides information on the percentage of carbon dioxide at the lower end of the enclosure. When this percentage reaches a predetermined value, the opening of the valves 44 is commanded : the carbon dioxide discharges to the outside, in such a way that the composition of the internal atmosphere of the envelope 11, especially in the neighbourhood of burner 29, remains favorable to a good combustion of the heating gas.

Eventually, fresh air is reinjected inside the envelope by turning on the motor-ventilator group 14.

The presence of a metal gauze or analogue around the burner is motivated by security reasons.

This invention provides an envelope comprising a body of nylon cloth or the like, the internal side of which is furnished with a heat resisting lining, preferably obtained by coating with plastic foam or a product derived from fibreglass.

In an alternative embodiment, the envelope is double and comprises two layer of nylon cloth or the like braced either with honeycomb material, or with net weft defining cells filled with air and constituting an isolating mattress.

The heat loss of the air inside the envelope is thus diminished to the benefit of a longer conservation of the buoyant force.

Reference is now made to FIGS. 2 to 8; the envelope 101 of the balloon (FIG. 2) has now a lower opening 102 surrounded by a pad 103 there. On the pad 103 is secured by a strap 103' a circular annular platform 104. This platform (FIGS. 3 and 4) has a frame comprising principally a diametrally extending tube 105 projecting on both sides of the annular plate 106, terminating in a shaped part 107 and constituting the body of the platform there. In the opening of the platform is placed a lower chimney member 108, in which is placed a ventilator 109 the shaft of which is driven by a pulley 110 on which passes a belt 112 driven by a motor 113 carried by the frame tube 105. On the upper edge 114 of the chimney member 108 is secured the lower end of a flexible air sleeve 115. The upper opening of the chimney member 108 is protected by a grating 116.

The platform 104 carries radially exending rails 121, 122, 123, 124, angularly placed at 90° from each other. The rails 122, 123 serve to guide rollers 61 and 62 onto which are secured in articulated relationship the ends of diagonal bars 63 and 64 (FIGS. 4 and 5) articulated one onto the other in 65, and the other ends 66 and 67 of which are maintained onto two other diagonal bars 68 and 69 articulated one onto the other in 70. These bars constitute a well known mechanical system called Nuremberg scissors or pantograph 71a. A first spring is provided between the lower ends 251 and 252 of the bars 63 and 64 and tends to move the rollers 61 and 62 in a direction bringing them closer to the centre of the platform as shown by arrows. A second spring 73 is provided between the ends 66 and 67 and tends to move them towards oneanother.

A similar kinomatic system 71b (FIG. 6) is provided between roller 62 and a roller 74 moving along the rail 124. A third articulated system 71c is provided between roller 74 and a roller 75 guided inside rail 121, and a fourth articulated system 71d is provided between roller 75 and roller 61.

Figure 7:
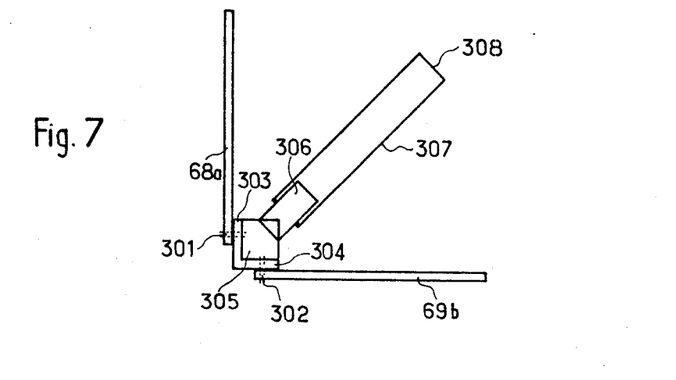
FIG. 7 is a schematic view of a portion of the device.
Figure 8:
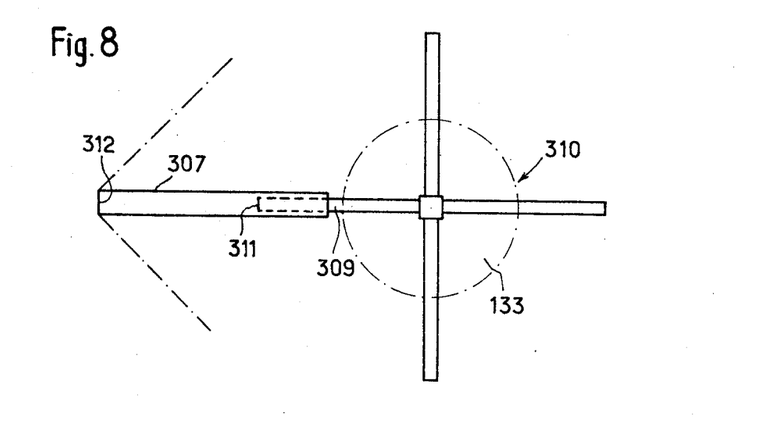
FIG. 8 is a schematic plan view of a portion of the burner device.

The upper ends 301 (FIG. 7) of bar 68a of system 71a and the adjacent end 302 of bar 69b of system 71b are secured in pivoting relationship onto the branches 303 and 304 of a bracket 305 integral with a tongue 306. Onto this tongue is secured a diagonal tube 307, the axis of which is a plane perpendicular to the planes of systems 71a and 71b and is angularly equidistant from those planes. Into the open end 308 of tube 307 is fitted in sliding relationship a cylindrial rod 309 (FIG. 8).

A similar configuration is provided at the other junction ends of the kinomatic systems 71b and 71c, 71c and 71d, 71d and 71a. The rods 309 constitute then a cross-piece 310 with four arms and it is onto this cross-piece that the burner 133 is secured, with its annexes, specially its ignition means and its protection gratings or shields 134 and 135.

Figure 5:
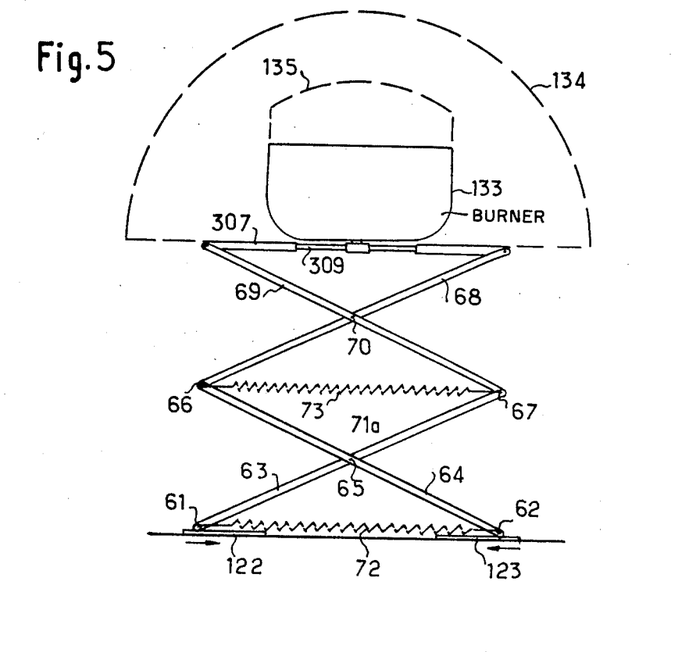
FIG. 5 is a schematical view illustrating the operation of the elevating device.
Figure 6:
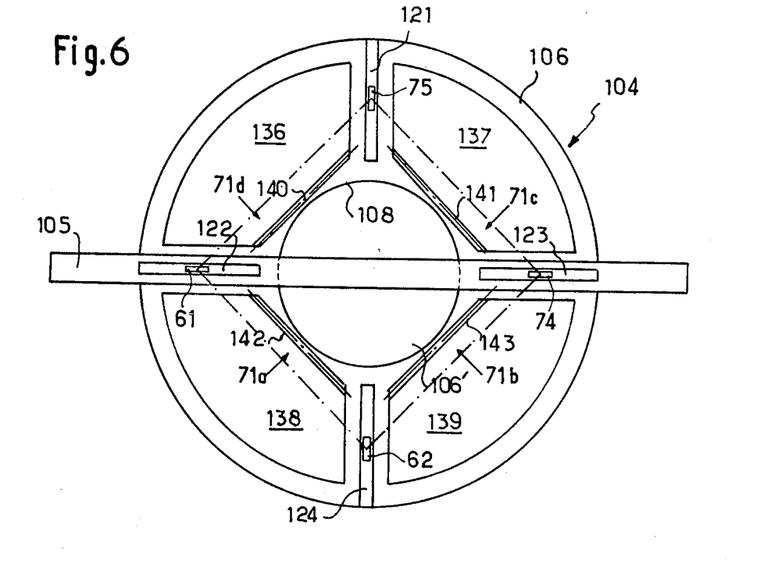
FIG. 6 is a schematic plan view of the platform.

In contracted or collapsed position of the scissors' systems 71, the rollers 61, 62, 74, 75 are towards the external ends of the rails 121, 124 and the springs 72 and 73 are stretched. When the kinematic systems 71 are released, the action of the springs 72, 73 causes the rollers to move along their respective rails and the parallelogram systems unfoldng under the action of the springs raise the burner 133 automatically. In the course of this movement, the tubes 307 move along the rods 309; at the end of their course, the external ends 311 of the rods are near the bottom 312 of the tubes 307. In the subsiding condition of the kinematic systems, the ends of the rods 311 are near the ends 308 of the tubes, but still inside them.

The collapsing of the burner, for example for the transport of the balloon to the ground, is realized by means of lowering cables at the disposal of the occupants of the nacelle.

A locking means is provided to maintain the device lowered as long as the burner is not useful.

Figure 3:
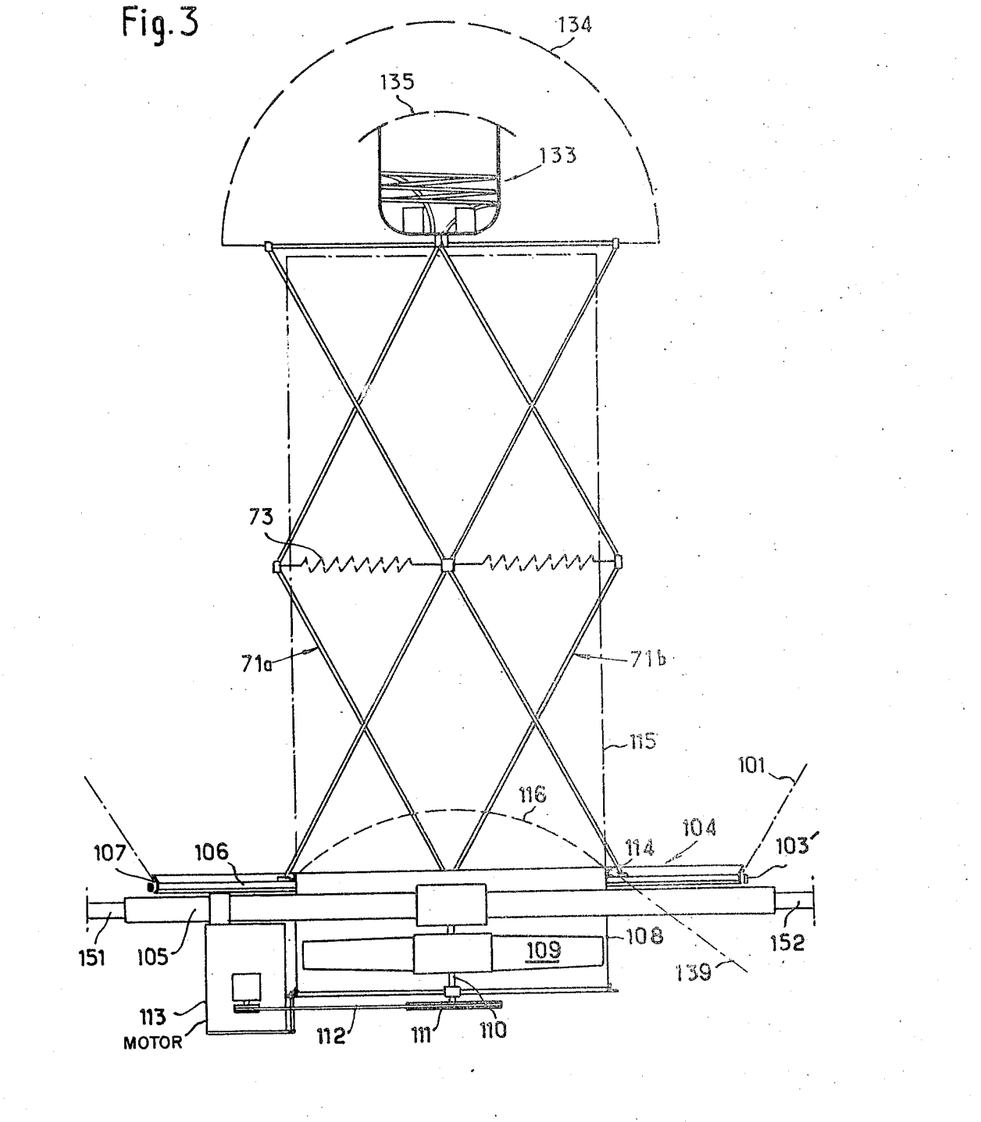
FIG. 3 is an elevation view at a larger scale of a portion of the platform with the devices it sustains.
Figure 4:
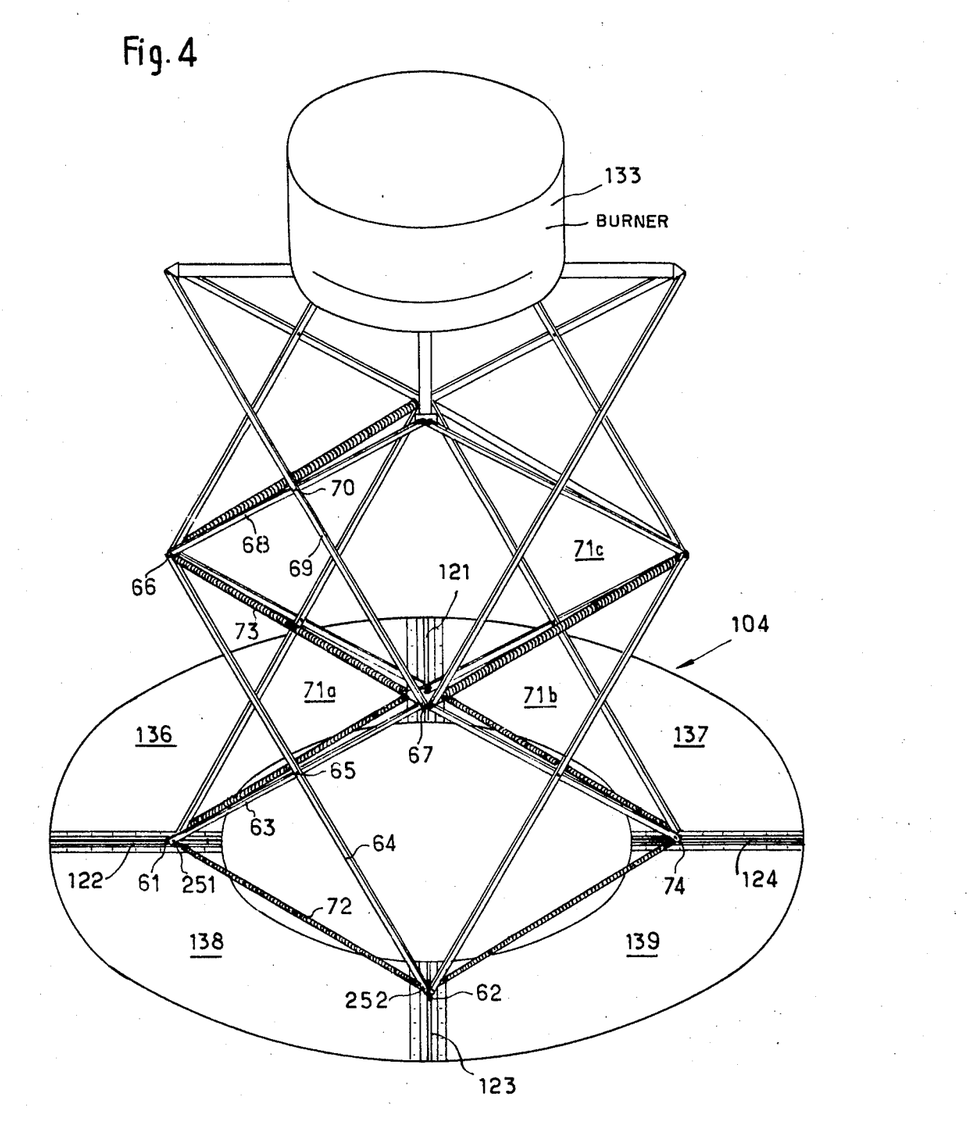
FIG. 4 is a schematical perspective view of the platform and of the erectible device carrying the burner.

The quadrants of the platform 104 limited by the rails 121-124 are constituted by panels with truncated sector shape 136, 137, 138, 139 (FIG. 6) which are hinged on their internal rectilinear edges 140, 141, 142, 143 respectively. These panels are subjected to the action of calibrated springs, so that they open automatically and play the role of valves when the internal pressure of the envelope exceeds a predetermined value, and are adjustable as desired. The panels can also be operated manually from the nacelle 144. The panel 139 on FIG. 3 is shown schematically in an open position.

Figure 2:
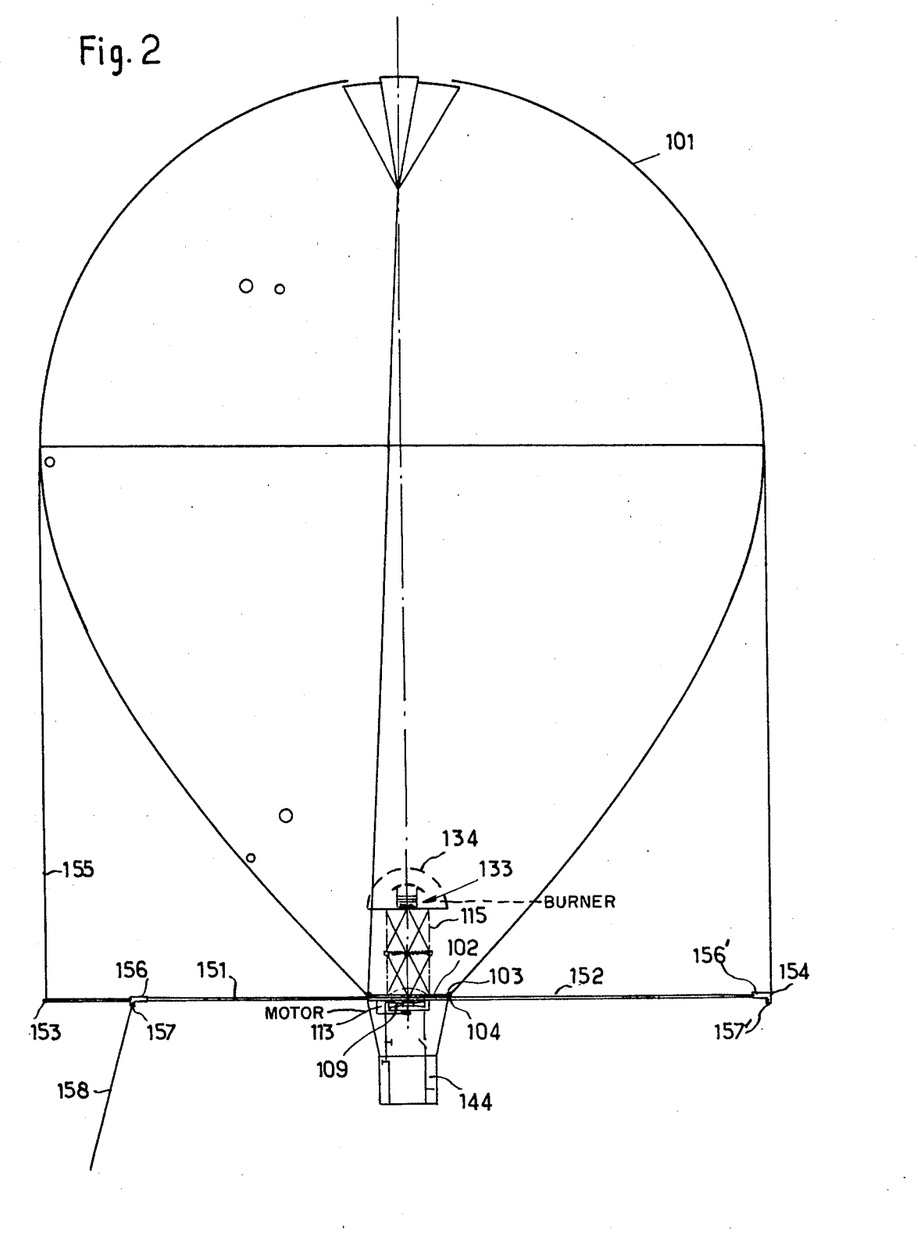
FIG. 2 is an elevation view of an aerostat in another embodiment.

The tube 105 serves to maintain two radial rails 151 and 152 diametrically opposed, the length of which is such that their ends 153 and 154 are practically aligned with the equatorial extremities of the envelope 101. Sustaining means 155 are provided to sustain rails 151 and 152.

On rail 151 can move a carriage 156 comprising a hook 157 to fasten a cable 158 to retain the balloon. When the carriage 156 is at the end 153 of the rail 151 and the cable 158 is fastened, the effect of the wind on the balloon does not cause the polar axis of the balloon to be greatly inclined; the inclination is less marked than for a balloon fastened to its nacelle, because, on one hand, of the lateral removal of the extemity 153 and, on the other hand, of the elevated position of this extremity relatively to the nacelle.

When it is desired to bring back the balloon to the ground in its inflated state, it is preferable to move the carriage 156 towards the polar axis.

The other rail 152, on which can also move a carriage 156' with a hook 157', can be used to secure on the carriage observation instruments or objects, or even persons. The release of a man equipped with a kite or a parachute is preferably made at the extremity 154 the furthest from the cable 158.

The control of the carriage takes place from the nacelle.

What is claimed is:

1. A hot air aerostat comprising: an envelope, a closable valve member disposed in said envelope, said envelope and valve member defining a substantially closed volume of air when said valve member is in its closed state; a nacelle attached to said envelope; a burner having an operational state disposed inside said volume of air to heat the air contained in said envelope, said burner being disposed at a relatively large distance from said envelope when in said operational state; a fuel tank disposed in said nacelle, said fuel tank being connected to said burner; ignition means disposed in the vicinity of said burner; a fan to blow air from the external atmosphere into said envelope through said valve member, said valve member comprising a rigid member defining an aperture in said envelope and a flexible sleeve member having an end projecting into said aperture, said flexible sleeve member having extended and collapsed state, said sleeve member closing said aperture when in said collapsed state, and being extendible into said volume of air under activation of said fan.

2. A hot air aerostat according to claim 1 wherein said sleeve member has an extremity, and wherein in the extended state of said sleeve member the extremity of said sleeve member situated inside said volume of air is adjacent to said burner in its operational state.

3. A hot air aerostat according to claim 1 wherein said burner is a gas burner and further comprising suspension cables attached to said envelope, said burner being suspended in its operational state by said suspension cables.

4. A hot air aerostat according to claim 1 further comprising an erection device supported by said rigid member, and wherein said burner is supported by said erection device, said erection device being positionable in stored and operational positions, being located in said stored position in the vicinity of said aperture and being elevated in said operational position.

5. A hot air aerostat according to claim 4 wherein said rigid member is an annular planar platform having a plurality of apertures, and further comprising a plurality of valves for closing said apertures, respectively, said valves opening toward the atmosphere when the pressure inside said envelope increases above a given predetermined level.

6. A hot air aerostat comprising: an envelope, a closable valve member disposed in said envelope, said envelope and valve member defining a substantially closed volume of air when said valve member is in its closed state; a nacelle attached to said envelope, a burner having an operational state disposed inside said volume of air to heat the air contained in said envelope into an operational state, in which said envelope is balloon-shaped and has an aquatorial line, said burner being locatable at a relatively large distance from said envelope when in said operational state; a fuel tank disposed in said nacelle, said fuel tank being connected to said burner; ignition means disposed in the vicinity of said burner, a radially extending arm, said envelope having a neck-ring, carrying means for linking said neck-ring to said radially extending arm, and support means linking said radially extending arm to a point of the envelope situated near the equatorial line of the envelope;

a positionable carriage slidably mounted on said radially extendng arm and fastening means disposed on said carriage, for anchoring the aerostat by an anchoring means.

7. A hot air aerostat comprising: an envelope, a closable valve member disposed in said envelope, said envelope and valve member defining a substantially closed volume of air when said valve member is in its closed state; a nacelle attached to said envelope; a burner having an operational state disposed inside said volume of air to heat the air contained in said envelope into an operational state in which said envelope is balloon-shaped and has an equatorial line, said burner being locatable at a relatively large distance from said envelope when in said operational state; a fuel tank disposed in said nacelle, said fuel tank being connected to said burner; ignition means disposed in the vicinity of said burner, a radially extending arm, said envelope having a neck-ring, carrying means for linking said neck-ring to said radially extending arm, and support means for linking said radially extending arm to a point of the envelope situated near the equatorial line of the envelope; and a positionable carriage slidably mounted on said radially extending arm for carrying a load.

8. A hot air aerostat comprising: an envelope, a closable valve member disposed in said envelope, said envelope and valve member defining a substantially closed volume of air when said valve member is in its closed state; a nacelle attached to said envelope; a burner having an operational state disposed inside said volume of air to heat the air contained in said envelope, said burner being locatable at a relatively large distance from said envelope when in said operational state; a fuel tank disposed in said nacelle, said fuel tank being connected to said burner; ignition means disposed in the vicinity of said burner; a rigid member defining an aperture in said envelope, an erection device supported by said rigid member, said burner being supported by said erection device, said erection device being positionable in stored and operational positions and being located in said stored position in the vicinity of said aperture and being elevated in said operational position.

* * * * *